March 13, 1973  F. D. COATES  3,720,010
SNOWPLOW WING
Filed Aug. 25, 1970  2 Sheets-Sheet 1
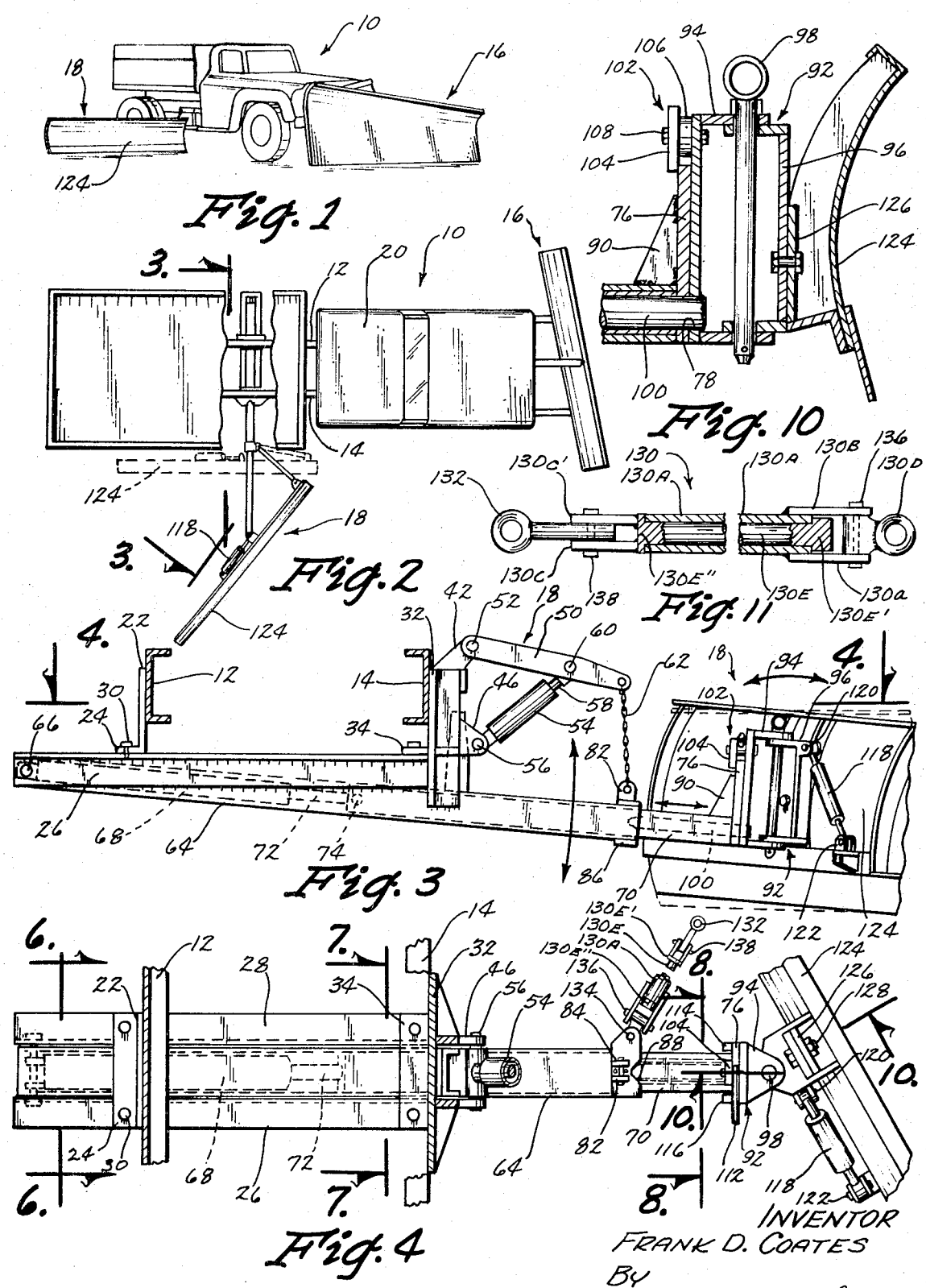
INVENTOR
FRANK D. COATES
BY
Zarley, McKee & Thomte
ATTORNEYS March 13, 1973  F. D. COATES  3,720,010
SNOWPLOW WING
Filed Aug. 25, 1970  2 Sheets-Sheet 2
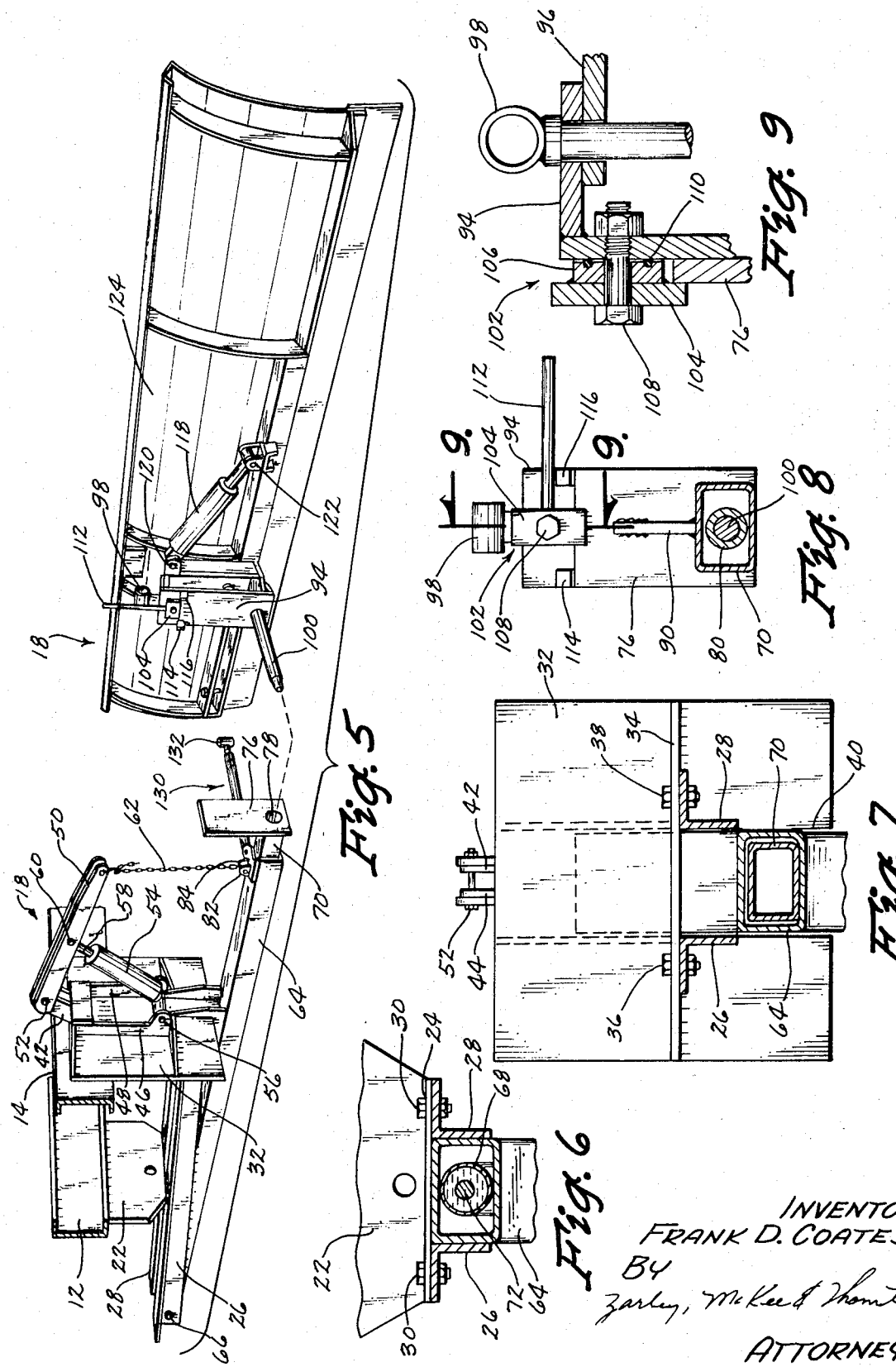
INVENTOR
FRANK D. COATES
BY
Zarley, McKee & Thomte
ATTORNEYS

# United States Patent Office 3,720,010
Patented Mar. 13, 1973

3,720,010
SNOWPLOW WING
Frank D. Coates, Corydon, Iowa, assignor to Coates
Manufacturing Co., Corydon, Iowa
Filed Aug. 25, 1970, Ser. No. 66,691
Int. Cl. E01h 5/06; E02f 3/86
U.S. Cl. 37—42 R          6 Claims

ABSTRACT OF THE DISCLOSURE

A snowplow wing for use on a truck which may be moved from a non-operative position adjacent the truck to an operative position laterally of the truck. A first support means is secured to the truck frame rearwardly of the cab and has the inner end of a first tube pivotally secured thereto. A second tube is slidably mounted in the outer end of the first tube by means of a first hydraulic cylinder mounted in the first tube. A second hydraulic cylinder is connected to the outer end of the first tube for pivotally raising and lowering the outer end of the tubes. A mounting bracket is secured to the outer end of the second tube and is adapted to be detachably connected to a pivot bracket assembly secured to the rearward side of the moldboard. A third hydraulic cylinder is connected to and extends between the moldboard and pivot bracket assembly for pivotally moving the moldboard about a horizontal axis intermediate the length thereof. A stabilizer rod extends between the moldboard and first tube which causes the moldboard to be pivoted about a vertical axis as the first hydraulic cylinder is operated. The moldboard automatically folds or moves to a position adjacent the truck as the first hydraulic cylinder slidably moves the second tube into the first tube.

---

Conventional snowplow wings require elaborate supporting structure to be mounted on the truck and the connection and disconnection thereof requires considerable time. Further, the conventional snowplow wings place an undesirable amount of weight on the front axle, springs and wheel bearings of the truck. Additionally, the conventional snowplow wings require that a certain amount of space be provided between the box and the cab of the truck so that a supporting post structure may be mounted therein. The conventional snowplow wings are not conveniently operated and require that the operator manually make certain adjustments thereon. The snowplow wings heretofore available frequently exceed the legal vehicle width when the wing is moved to its inoperative position adjacent the truck.

Therefore, it is a principal object of this invention to provide a snowplow wing.

A further object of this invention is to provide a snowplow wing which is quickly attached to or detached from the truck.

A further object of this invention is to provide a snowplow wing which places the weight of the wing on the truck frame rather than on the front axle, springs and wheel bearings.

A further object of this invention is to provide a snowplow wing which is very stable in operation.

A further object of this invention is to provide a snowplow wing which permits the wing to be carried at a desired plowing height or at a floating height.

A further object of this invention is to provide a snowplow wing which can be precisely controlled from the truck cab.

A further object of this invention is to provide a snowplow wing which automatically folds to an inoperative position adjacent the truck for clearing bridges, transporting, or storing.

A further object of this invention is to provide a snowplow wing wherein the supporting means for the wing does not exceed the legal width when the wing is removed therefrom.

A further object of this invention is to provide a snowplow wing which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of the snowplow wing mounted on a truck.

FIG. 2 is a top elevational view of the device illustrating the manner in which the device may be folded to an inoperative position adjacent the truck.

FIG. 3 is an enlarged sectional view as seen along lines 3—3 of FIG. 2.

FIG. 4 is a sectional view seen along lines 4—4 of FIG. 3.

FIG. 5 is an exploded perspective view of the wing.

FIG. 6 is a sectional view as seen along lines 6—6 of FIG. 4.

FIG. 7 is an enlarged sectional view as seen along lines 7—7 of FIG. 4.

FIG. 8 is an enlarged sectional view as seen along lines 8—8 of FIG. 4.

FIG. 9 is an enlarged sectional view as seen along lines 9—9 of FIG. 8.

FIG. 10 is an enlarged sectional view as seen along lines 10—10 of FIG. 4.

FIG. 11 is a partial sectional view of a stabilizer rod.

The numeral 10 refers generally to a truck having a pair of longitudinally extending frame members 12 and 14. A snowplow 16 is mounted at the forward end of the truck in conventional fashion. The snowplow wing of this invention is designated by the reference numeral 18 and is secured to the frame members 12 and 14 behind the cab 20 so that the weight thereof is carried by the truck where the truck is designed to carry weight rather than on the front axle, springs and wheel bearings.

Plate 22 is secured to frame member 12 by welding or the like and extends downwardly therefrom. Bar 24 is welded to the lower end of plate 22 and has a pair of elongated angles 26 and 28 secured thereto intermediate the lengths thereof in a spaced apart relationship by bolts 30 in the manner illustrated in FIG. 6. Plate 32 is secured at its upper end to frame member 14 by welding or the like and extends downwardly therefrom. Plate 32 has a bar 34 welded thereto which extends transversely therefrom. Bar 34 supports the angles 26 and 28 by means of bolts 36 and 38 as seen in FIG. 7. Plate 32 is provided with a notch 40 formed therein which extends upwardly thereinto in the lower central area thereof.

Plate 32 has a pair of ears 42 and 44 welded to the upper end thereto which extends upwardly and outwardly therefrom in a spaced apart relationship. Ears 46 and 48 are welded to plate 32 and extend outwardly therefrom as seen in FIG. 5. Lift arm 50 is pivoted at its inner end to ears 42 and 44 by means of pin 52. The lower end of a hydraulic lift cylinder 54 is pivoted to ears 46 and 48 by means of pin 56. The extendible rod 58 of cylinder 54 is pivotally connnected to lift arm 50 by means of pin 60. Chain 62 is secured to its upper end to the outer end of lift arm 50 as seen in FIG. 5.

Tube 64 is pivotally connected at its inner end to angles 26 and 28 by pin 66 and is movable therebetween as seen in FIG. 5. A hydraulic cylinder 68 is mounted in tube 64 by any convenient means for moving tube 70 which is slidably received by tube 64 as illustrated in FIG. 3. The rod 72 of cylinder 68 is connected to the inner end of tube 70 by pin 74. Bracket 76 is welded to the outer end of tube 70 and has an opening 78 provided therein which registers with a tube section 80 secured to bracket 76 and extending inwardly into tube 70. The lower end of chain 62 is connected to ears 82 and 84 extending upwardly from bracket 86 mounted on the outer end of tube 64. The uppermost of brackets 86 and tube 64 are provided with a V-shaped notch 88 on the upper outer ends thereof which are adapted to receive the lower end of gusset plate 90 therein when tube 70 is withdrawn into tube 64.

The numeral 92 refers to a pivot bracket assembly comprising pivot brackets 94 and 96 detachably pivoted together by means of a pin 98 extending therethrough in the manner shown in FIGS. 3 and 4. Pivot bracket 94 has a pivot shaft 100 secured to its lower end which is adapted to be received by opening 78 and tube section 80. A latch assembly 102 is secured to the upper end of pivot bracket 94 for detachably securing the pivot bracket assembly 92 to the bracket 76. Assembly 102 comprises a bar 104 having a disc 106 secured to the inner surface of bracket 94 with a bolt 108 extending therethrough as seen in FIG. 9. O-ring 110 is provided on disc 106 between disc 106 and pivot bracket 94 to prevent binding between disc 106 and bracket 94. Handle 112 is secured to bar 104 for movement thereof. Stops 114 and 116 extend from bracket 94 and are in the pivotal path of handle 112 to limit the movement of handle 112 and to keep bracket 94 from rotating. As seen in FIG. 8, bracket 94 may be secured to bracket 76 by rotating the latch assembly 102 so that one end of bar 104 extends over the upper end of bracket 76.

The upper end of hydraulic cylinder 118 is pivotally connected to ear assembly 120 provided on pivot bracket 96. The lower end of cylinder 118 is pivoted to an ear assembly 122 operatively secured to the plow moldboard 124. Plate assembly 126 is secured to the rearward side of moldboard 124 by welding and is pivotally connected to pivot bracket 96 by a bolt 128.

Stabilizer rod 130 is pivotally connected at one end to the moldboard 124 by pin 132 and is pivotally connected at its other end to bracket 86 by pin 134.

As seen in FIG. 11, rod 130 is comprised of tube 130A which has ears 130B welded to one end thereof. Pin 136 connects tongue 130D between the ears, and tongue 130D receives pin 134. Shaft 130E is rotatably mounted within tube 130A, and has heads 130E' and 130E'' on opposite ends thereof to limit longitudinal movement. Ears 130C' are welded to head 130E'', and pin 132 is secured to ears 130C' by pin 138.

The normal method of operation is as follows. The wing 18 is mounted on the truck as previously described. The hydraulic cylinders 54, 68 and 118 would be operatively connected to the truck hydraulic system. The broken lines in FIG. 2 illustrate the inoperative or stored position of the wing and it can be seen that the wing does not objectionably protrude from the side of the truck when in its operative position. When it is desired to plow the snow from the shoulder of the road, it is simply necessary to actuate the hydraulic cylinder 68 to cause the extension of the rod 72 therefrom which causes tube 70 to be slidably moved outwardly from tube 64. As tube 70 slidably moves outwardly, the stabilizer rod 130 causes the moldboard 124 to pivot about pin 98 so that the angular relationship of moldboard 124 is increased upon further extension of the tube 70. Since the inner end of stabilizer rod 130 is secured to tube 64, the angular movement of the moldboard 124 is automatic upon the extension of the tube 70. When the moldboard has been positioned in the desired angular relationship with respect to the truck, the hydraulic cylinder 54 is operated to raise or lower the tube 64 and hence the moldboard. It can be seen that chain 62 limits the downward movement of the tube 64 but permits the tube to float upwardly if the moldboard should engage an obstruction or the like.

Hydraulic cylinder 118 may be operated to pivot the moldboard 124 about the bolt 128 so that the ends of the moldboard can be raised or lowered. The beam 64 is prevented from moving rearwardly with respect to the truck upon the moldboard engaging an obstruction by the fact that the beam 64 is received between the angles 26 and 28. The weight of the device is carried by the frame members 12 and 14 rearwardly of the cab and such location is the location where the truck is adapted to carry a majority of the load. The mounting of the device on the frame members 12 and 14 rearwardly of the cab 20 prevents the weight of the device from being carried by the front axle, springs and wheel bearings.

The wing may be folded to the position indicated by broken lines in FIG. 2 for clearing bridges, transporting or storing. The wing is moved to the position adjacent the truck by simply operating the hydraulic cylinder 68 to cause tube 70 to be pulled inwardly into the tube 64 thereby automatically folding the wing to the inoperative position. The moldboard may be easily removed from its supporting structure by simply pivoting the latch assembly 102 from the position of FIG. 8 to the position of FIG. 5 so that the bracket 76 may separate from the bracket 94. The moldboard may be manually moved away from the truck to cause the separation of the brackets 76 and 94 and to cause the separation of the shaft 100 from the tube section 80. The pin 134 is also removed. Manual movement of the moldboard during the disconnection operation may be eliminated by removing the moldboard when the tube 70 has been partially extended from the tube 64. The latch assembly 102 may then be unlocked and pin 134 then removed. The tube 70 can then be pulled inwardly into the tube 64 to cause the separation of the brackets 76 and 94 and to cause the separation of the shaft 100 from the tube section 80.

The moldboard may be again mounted on the supporting structure by simply causing the shaft 100 to be received in the tubular member 80 until the brackets 76 and 94 are closely adjacent. The latch assembly 102 can then be moved so that one end of the bar 104 extends over the upper end of the bracket 76. The pin 134 would then be secured to effect the pivotal connection of the stabilizer rod 130 and the bracket 86. Hydraulic cylinder 118 would then be hydraulically connected to the truck hydraulic system.

Thus it can be seen that an extremely convenient snowplow wing has been provided which may be precisely controlled from the cab. The wing may be raised or lowered as needed as may either end. The angular relationship of the wing with respect to the truck may be easily changed and the wing can be folded to an inoperative position from the cab. When the moldboard has been removed from its supporting structure, the legal vehicle width is not exceeded. Thus it can be seen that the device accomplishes at least all of its stated objectives.

I claim:
1. In combination with a wheeled vehicle having a longitudinal frame,
an elongated moldboard means having forward and rearward sides, and inner and outer ends,
a support member secured to said longitudinal frame intermediate the ends thereof,
first means pivotally connecting the inner end of said moldboard means to said support member,
a support arm telescopically secured to said support member and extending transversely across said longitudinal frame intermediate the ends thereof, the outer end of said support arm being pivotally secured to the rearward side of said moldboard means,
and hydraulic cylinder power means connected to said support arm to telescopically move said support arm to extended and withdrawn positions with respect to said support member so that when said support arm is in an extended position, said moldboard means is pivoted to an operative angular position with respect to said frame, and when said support arm is in a withdrawn position, said moldboard means is pivoted to an inoperative position substantially parallel to the longitudinal axis of said frame, said support member being movably secured to said frame, a second power means operatively connected between said frame and said support member whereby the vertical elevation of said support member, said support arm and said moldboard means can be selectively adjusted, a support means secured to said frame intermediate the ends thereof, said support member being movably secured to said support means, a lift arm pivotally connected at one end to said support means and extending outwardly therefrom, said second power means being a hydraulic cylinder means pivotally connected at one end to said support means and pivotally connected to said lift arm at its other end for vertically moving the outer end of said lift arm, and a chain means connecting the outer end of said lift arm and the outer end of said support member, said frame comprising a pair of frame members and said support means comprising a first plate means secured to one of said frame members and a second plate means secured to the other of said frame members, first and second spaced apart supports secured to said first and second plates and extending therebetween, said first and second spaced apart supports having inner and outer ends, said support member being pivotally secured at its inner end to said first and second supports at the inner end thereof and being received therebetween, said first and second supports closely embracing said support member for a majority of its length to prevent the rearward movement of said support member upon said moldboard means engaging an obstruction, the inner end of said support member being positioned outwardly of said first plate and extends beneath said frame members, the outer end of said support member being positioned outwardly of said other frame member.

2. In combination with a wheeled vehicle having a longitudinal frame,
an elongated moldboard means having forward and rearward sides, and inner and outer ends,
a support member secured to said longitudinal frame intermediate the ends thereof,
first means pivotally connecting the inner end of said moldboard means to said support member,
a support arm telescopically secured to said support member and extending transversely across said longitudinal frame intermediate the ends thereof, the outer end of said support arm being pivotally secured to the rearward side of said moldboard means,
and hydraulic cylinder power means connected to said support arm to telescopically move said support arm to extended and withdrawn positions with respect to said support member so that when said support arm is in an extended position, said moldboard means is pivoted to an operative angular position with respect to said frame, and when said support arm is in a withdrawn position, said moldboard means is pivoted to an inoperative position substantially parallel to the longitudinal axis of said frame,
an upstanding bracket secured to the outer end of said support arm, a first pivot bracket secured to said moldboard means at the rearward side thereof, a second pivot bracket pivotally secured to said first pivot bracket about a substantially vertical axis, a shaft means secured to said second pivot bracket extending therefrom and being received by the outer end of said support arm, and a latching assembly selectively detachably securing said second pivot bracket to said bracket.

3. The combination of claim 2 wherein said first pivot bracket is secured to said moldboard means about a substantially horizontal axis to permit the inner and outer ends of said moldboard means to be selectively raised and lowered respectively, and a hydraulic cylinder pivotally connected at one end to said first pivot bracket and pivotally secured at its other end to said moldboard means at the rearward side thereof for selectively pivoting said moldboard means with respect to said first pivot bracket to raise and lower the ends of said moldboard means.

4. In combination with a wheeled vehicle having a longitudinal frame,
an elongated moldboard means having forward and rearward sides, and inner and outer ends,
a support member secured to said longitudinal frame intermediate the ends thereof,
first means pivotally connecting the inner end of said moldboard means to said support member,
a support arm telescopically secured to said support member and extending transversely across said longitudinal frame intermediate the ends thereof, the outer end of said support arm being pivotally secured to the rearward side of said moldboard means,
and hydraulic cylinder power means connected to said support arm to telescopically move said support arm to extended and withdrawn positions with respect to said support member so that when said support arm is in an extended position, said moldboard means is pivoted to an operative angular position with respect to said frame, and when said support arm is in a withdrawn position, said moldboard means is pivoted to an inoperative position substantially parallel to the longitudinal axis of said frame, said support member being movably secured to said frame, a second power means operatively connected between said frame and said support member whereby the vertical elevation of said support member, said support arm and said moldboard means can be selectively adjusted, a support means secured to said frame intermediate the ends thereof, said support member being movably secured to said support means, a lift arm pivotally connected at one end to said support means and extending outwardly therefrom, said second power means being a hydraulic cylinder means pivotally connected at one end to said support means and pivotally connected to said lift arm at its other end for vertically moving the outer end of said lift arm, and a chain means connecting the outer end of said lift arm and the outer end of said support member, said frame comprising a pair of frame members and said support means comprising a first plate means secured to one of said frame members and a second plate means secured to the other of said frame members, first and second spaced apart supports secured to said first and second plates and extending therebetween, said first and second spaced apart supports having inner and outer ends, said support member being pivotally secured at its inner end to said first and second supports at the inner end thereof and being received therebetween, said first and second supports closely embracing said support member for a majority of its length to prevent the rearward movement of said support member upon said moldboard means engaging an obstruction.

5. In combination with a truck having a pair of longitudinally extending frame members, forward end, rearward end, and opposite sides, comprising,
a support means secured to said frame members intermediate the ends thereof,
a support member having inner and outer ends and being pivotally secured at its inner end about a horizontal axis to said support means and extending laterally therefrom towards one side of said truck, a support arm telescopically secured to said support member and having inner and outer ends, a first hydraulic cylinder means connecting said support arm and said support member for telescopically moving said support arm from retracted to extended positions with respect to said support member, an elongated moldboard means having forward and rearward sides, and inner and outer ends, first means operatively pivotally connecting said rearward side of said moldboard means to said support arm about a horizontal axis parallel to the longitudinal axis of said support arm and about a vertical axis, a second hydraulic cylinder means connected to said moldboard means for selectively pivoting said moldboard means about said horizontal axis with respect to said support arm so that the forward end of said moldboard means may be selectively raised or lowered while simultaneously lowering or raising the rearward end of said moldboard means respectively, a third hydraulic cylinder means connecting said support means and said support member for selectively raising and lowering the outer end of said support member and the moldboard means operatively secured thereto, and a stabilizer rod having one end pivotally connected to the rearward side of said moldboard means adjacent the forward end thereof, said stabilizer rod being pivotally connected at its other end to said support member adjacent the outer end thereof so that said moldboard means will be positioned closely adjacent said one side of said truck and in a substantially parallel relationship with respect thereto when said support arm is in its retracted position, said stabilizer rod causing said moldboard means to be positioned in an angular relationship with respect to the direction of the travel of the truck when said first hydraulic cylinder means causes said support arm to be extended from said support member.

6. The combination of claim 5 wherein a lift arm is pivotally connected at one end to said support means and extends outwardly therefrom, said third hydraulic cylinder means being pivotally connected at one end to said support means and pivotally connected at its outer end to said lift arm for vertically moving the outer end of said lift arm, and a chain means connecting the outer end of said lift arm and the outer end of said support member for limiting the downward movement of said moldboard means while permitting the moldboard means to float upwardly over obstructions which it engages.

References Cited

UNITED STATES PATENTS

| | | | |
|---|---|---|---|
| 1,993,003 | 3/1935 | Green et al. | 37—108 R |
| 2,084,690 | 6/1937 | Knapp | 172—805 X |
| 2,734,292 | 2/1956 | Graves | 172—804 |
| 1,550,575 | 8/1925 | Sargent | 37—44 |
| 2,005,392 | 6/1935 | Remus | 37—44 |
| 1,905,420 | 4/1933 | Moritz | 172—782 X |
| 1,864,183 | 6/1932 | Bridges et al. | 37—105 |
| 2,091,343 | 8/1937 | Soule et al. | 37—42 R |
| 3,559,749 | 2/1971 | Fryrear et al. | 172—802 |

FOREIGN PATENTS

| | | |
|---|---|---|
| 1,564,144 | 3/1969 | France. |
| 56,361 | 3/1936 | Norway. |

CLYDE I. COUGHENOUR, Primary Examiner

U.S. Cl. X.R.

37—105. 117.5; 172—780, 786, 795